United States Patent
Bandi et al.

(10) Patent No.: US 12,434,666 B2
(45) Date of Patent: Oct. 7, 2025

(54) SYSTEM AND METHOD FOR DETECTING VEHICLE INTRUSIONS

(71) Applicant: Ford Global Technologies, LLC, Dearborn, MI (US)

(72) Inventors: Krishna Bandi, Farmington Hills, MI (US); Meghna Menon, Ann Arbor, MI (US); Bryan Michael Bolger, Canton, MI (US); Brennan Hamilton, Birmingham, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 329 days.

(21) Appl. No.: 18/154,385

(22) Filed: Jan. 13, 2023

(65) Prior Publication Data
US 2024/0239302 A1 Jul. 18, 2024

(51) Int. Cl.
| | |
|---|---|
| *B60R 25/33* | (2013.01) |
| *B60R 25/01* | (2013.01) |
| *B60R 25/30* | (2013.01) |
| *B60W 30/06* | (2006.01) |
| *B60W 60/00* | (2020.01) |
| *G08G 1/14* | (2006.01) |

(52) U.S. Cl.
CPC .............. *B60R 25/33* (2013.01); *B60R 25/01* (2013.01); *B60R 25/305* (2013.01); *B60W 30/06* (2013.01); *B60W 60/001* (2020.02); *G08G 1/14* (2013.01)

(58) Field of Classification Search
CPC ....... B60R 25/01; B60R 25/33; B60R 25/305; B60W 30/06; B60W 50/00; B60W 40/08; B60W 2040/0809; B60W 2040/0818; B60W 2040/0881; B60W 60/001
USPC ......... 701/23, 45; 235/380, 382.5, 384, 389; 340/825.06, 825.54
See application file for complete search history.

(56) References Cited

U.S. PATENT DOCUMENTS

| | | | |
|---|---|---|---|
| 5,635,693 A | 6/1997 | Benson et al. | |
| 8,131,429 B2* | 3/2012 | Plaster | B60R 25/102 701/45 |
| 9,157,752 B1* | 10/2015 | Fernández Garcia | B60R 25/30 |
| 9,240,019 B2* | 1/2016 | Ricci | B60K 35/22 |
| 9,688,244 B2 | 6/2017 | Martin et al. | |
| 10,124,769 B2* | 11/2018 | Sandhu | H04L 67/12 |
| 10,131,362 B1 | 11/2018 | Gingrich et al. | |
| 11,498,553 B2* | 11/2022 | Tsujino | G06V 20/586 |
| 11,820,328 B2* | 11/2023 | Sekine | B60R 25/24 |
| 2006/0026017 A1 | 2/2006 | Walker | |

(Continued)

*Primary Examiner* — Andrew Joseph Rudy
(74) *Attorney, Agent, or Firm* — Burris Law, PLLC

(57) ABSTRACT

A method includes instructing a vehicle to autonomously navigate to a given parking space from among the plurality of parking spaces, setting the given parking space to an occupied state in response to the vehicle being positioned within the given parking space, and obtaining infrastructure sensor data from an infrastructure sensor. The method includes determining whether the given parking space has transitioned from the occupied state to the unoccupied state based on the infrastructure sensor data, and in response to determining the given parking space has transitioned to the unoccupied state: obtaining location data from the vehicle, determining whether the vehicle is located at a predefined location based on the location data, and instructing the vehicle to perform a vehicle intrusion routine in response to the vehicle not being located at the predefined location.

20 Claims, 4 Drawing Sheets

(56) References Cited

U.S. PATENT DOCUMENTS

| | | |
|---|---|---|
| 2007/0079012 A1 | 4/2007 | Walker |
| 2008/0091309 A1 | 4/2008 | Walker |
| 2011/0133912 A1* | 6/2011 | Tesman ................ B60R 25/045 340/426.12 |
| 2017/0200197 A1 | 7/2017 | Brubaker |
| 2018/0208156 A1 | 7/2018 | Sandhu et al. |
| 2018/0334137 A1 | 11/2018 | Salter et al. |
| 2019/0066494 A1 | 2/2019 | Elsheemy |
| 2019/0141467 A1 | 5/2019 | Breed |
| 2020/0101937 A1 | 4/2020 | Skikun et al. |

* cited by examiner

SYSTEM AND METHOD FOR DETECTING VEHICLE INTRUSIONS

FIELD

The present disclosure relates to systems and methods for detecting vehicle intrusions.

BACKGROUND

The statements in this section merely provide background information related to the present disclosure and may not constitute prior art.

Vehicles may be positioned in a parking lot for a given period of time and prior to being deployed to a future destination. As an example, a manufacturing system may include a parking lot that temporarily stores vehicles as they transition between various manufacturing stages and/or to a final destination, such as a dealership. As another example, a vehicle or ride sharing system may include a parking lot that stores vehicles that are employed as part of a vehicle sharing event via a vehicle sharing service and/or a ride sharing event via a ride sharing service. However, vehicles that are stored in the parking lot may be subjected to vehicle intrusions (e.g., unauthorized vehicle entries and/or operation of the vehicle). These issues with vehicle intrusions, among other issues, are addressed by the present disclosure.

SUMMARY

This section provides a general summary of the disclosure and is not a comprehensive disclosure of its full scope or all of its features.

The present disclosure provides a method for monitoring vehicle intrusions in a parking lot comprising a plurality of parking spaces. The method includes instructing a vehicle to autonomously navigate to a given parking space from among the plurality of parking spaces, setting the given parking space to an occupied state in response to the vehicle being positioned within the given parking space, and obtaining infrastructure sensor data from an infrastructure sensor, where the infrastructure sensor data includes information indicating a parking state of each of the plurality of parking spaces, and where the parking state is one of the occupied state and an unoccupied state. The method includes determining whether the given parking space has transitioned from the occupied state to the unoccupied state based on the infrastructure sensor data; and in response to determining the given parking space has transitioned to the unoccupied state: obtaining location data from the vehicle; determining whether the vehicle is located at a predefined location based on the location data; and instructing the vehicle to perform a vehicle intrusion routine in response to the vehicle not being located at the predefined location.

The following paragraph includes variations of the method of the above paragraph, and the variations may be implemented individually or in any combination.

In one form, the method further includes determining whether the vehicle has transitioned from an off state to an on state in response to determining the given parking space has transitioned to the unoccupied state. In one form, the method includes performing the vehicle intrusion routine in response to determining the vehicle has not transitioned from the off state to the on state. In one form, instructing the vehicle to perform the vehicle intrusion routine comprises: instructing the vehicle to transition to an on state; and instructing the vehicle to broadcast sensor data from one or more sensors of the vehicle. In one form, the one or more sensors includes an image sensor, where the sensor data is image data, and where the method further comprises: obtaining the image data from the image sensor; and determining a probability of the vehicle intrusion based on the image data. In one form, the image data is associated with an interior of the vehicle. In one form, the image data is associated with an exterior of the vehicle. In one form, the method includes deactivating one or more functions of the vehicle in response to the probability of the vehicle intrusion being greater than a threshold probability value. In one form, the one or more sensors includes a global navigation satellite system (GNSS) sensor, where the sensor data is GNSS data, and where the method further comprises: obtaining the GNSS data from the GNSS sensor of the vehicle; and determining a probability of the vehicle intrusion based on the GNSS data. In one form, the method includes deactivating one or more functions of the vehicle in response to the probability of the vehicle intrusion being greater than a threshold probability value.

The present disclosure provides a system for monitoring vehicle intrusions in a parking lot comprising a plurality of parking spaces includes one or more processors and one or more nontransitory computer-readable mediums comprising instructions that are executable by the one or more processors. The instructions comprise: instructing a vehicle to autonomously navigate to a given parking space from among the plurality of parking spaces; setting the given parking space to an occupied state in response to the vehicle being positioned within the given parking space; and obtaining infrastructure sensor data from an infrastructure sensor, where the infrastructure sensor data includes information indicating a parking state of each of the plurality of parking spaces, and where the parking state is one of the occupied state and an unoccupied state. The instructions include determining whether the given parking space has transitioned from the occupied state to the unoccupied state based on the infrastructure sensor data; and in response to determining the given parking space has transitioned to the unoccupied state, the instructions include: obtaining location data from the vehicle; determining whether the vehicle is located at a predefined location based on the location data; instructing the vehicle to transition to an on state; instructing the vehicle to broadcast sensor data from one or more sensors of the vehicle; and instructing the vehicle to perform a vehicle intrusion routine in response to the vehicle not being located at the predefined location.

The following paragraph includes variations of the system of the above paragraph, and the variations may be implemented individually or in any combination.

In one form, the instructions further comprise determining whether the vehicle has transitioned from an off state to an on state in response to determining the given parking space has transitioned to the unoccupied state. In one form, the instructions further comprise performing the vehicle intrusion routine in response to determining the vehicle has not transitioned from the off state to the on state. In one form, the one or more sensors includes an image sensor, where the sensor data is image data, and where the instructions further comprise: obtaining the image data from the image sensor; and determining a probability of the vehicle intrusion based on the image data. In one form, the image data is associated with an interior of the vehicle. In one form, the image data is associated with an exterior of the vehicle. In one form, the instructions further comprise deactivating one or more functions of the vehicle in response to the probability of the vehicle intrusion being greater than a threshold probability value. In one form, the one or more sensors includes a global navigation satellite system (GNSS) sensor, where the sensor data is GNSS data, and where the instructions further comprise: obtaining the GNSS data from the GNSS sensor of the vehicle; and determining a probability of the vehicle intrusion based on the GNSS data. In one form, the instructions further comprise deactivating one or more functions of the vehicle in response to the probability of the vehicle intrusion being greater than a threshold probability value.

The present disclosure provides a method for monitoring vehicle intrusions in a parking lot comprising a plurality of parking spaces. The method includes instructing a vehicle to autonomously navigate to a given parking space from among the plurality of parking spaces; setting the given parking space to an occupied state in response to the vehicle being positioned within the given parking space; and obtaining infrastructure sensor data from an infrastructure sensor, where the infrastructure sensor data includes information indicating a parking state of each of the plurality of parking spaces, and where the parking state is one of the occupied state and an unoccupied state. The method includes determining whether the given parking space has transitioned from the occupied state to the unoccupied state based on the infrastructure sensor data. The method includes, in response to determining the given parking space has transitioned to the unoccupied state: obtaining location data from the vehicle; determining whether the vehicle is located at a predefined location based on the location data; instructing the vehicle to transition to an on state; instructing the vehicle to broadcast sensor data from one or more sensors of the vehicle; and instructing the vehicle to perform a vehicle intrusion routine in response to the vehicle not being located at the predefined location.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
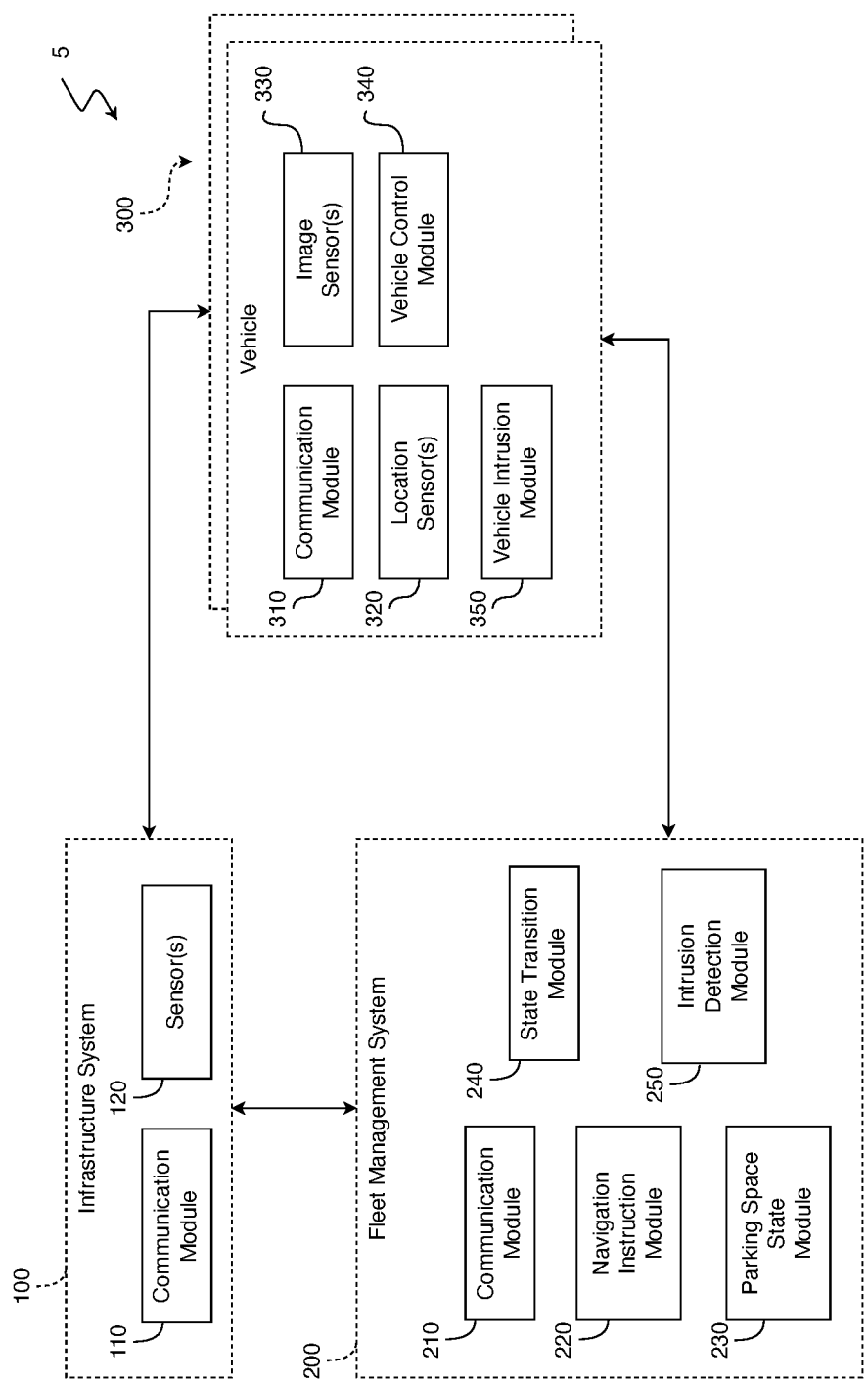
FIG. 1 is a functional block diagram of an example fleet management system, a plurality of vehicles, and an infrastructure system in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides systems and methods for monitoring vehicle intrusions in a parking lot comprising a plurality of parking spaces. A fleet management system obtains infrastructure sensor data indicating a parking state of a plurality of parking spaces and monitors for transitioned between an occupied state and an unoccupied state based on the infrastructure sensor data. In response to determining that a parking space transition has occurred, the fleet management system obtains location data from a vehicle that was previously assigned to the given parking space and determines whether the vehicle is located at a predefined location. When the vehicle is not at one or more predefined locations, the fleet management system instructs the vehicle to perform or initiate a vehicle intrusion routine, which may include activating interior or exterior camera sensors of the vehicle and performing various image processing routines to generate a probability of a vehicle intrusion occurring. By performing the monitoring routines described herein, the fleet management system may perform various corrective actions for addressing potential vehicle intrusions, such as selectively deactivating one or more functions/systems of the vehicle.

Referring to FIGS. 1A-1B, a parking lot 5 defined by a plurality of parking spaces 10 is shown and generally includes an infrastructure system 100, a fleet management system 200, and a plurality of vehicles 300. The parking lot 5 may be provided in conjunction with various types of systems, such as a manufacturing system that employs autonomous navigation routines for controlling the movement of the vehicles 300, a vehicle/ride sharing system that employs the vehicles 300 for one or more vehicle sharing sessions, a parking lot control system that manages the storage and arrangement of the vehicles 300, among other types of systems.

In one form, the infrastructure system 100 includes a communication module 110 and one or more infrastructure sensors 120, and the fleet management system 200 includes a communication module 210, a navigation instruction module 220, a parking space state module 230, a state transition module 240, and an intrusion detection module 250. In one form, the vehicles 300 each include a communication module 310, one or more location sensors 320, one or more image sensors 330, a vehicle control module 340, and a vehicle intrusion module 350. It should be understood that any one of the modules of the infrastructure system 100, the fleet management system 200, and the vehicles 300 can be provided at the same location or distributed at different locations (e.g., via one or more edge computing devices) and communicably coupled accordingly.

In one form, the infrastructure system 100, the fleet management system 200, and the vehicles 300 are communicably coupled via the communication modules 110, 210, 310. As an example, the communication modules 110, 210, 310 may employ known wireless communication protocols to communicate, such as a cellular protocol, a wireless fidelity (Wi-Fi)-type protocol, a Bluetooth®-type protocol, a near-field communication (NFC) protocol, and/or an ultra-wideband (UWB) protocol. Additionally, or alternatively, communication modules 110, 210, 310 may employ a vehicle-to-vehicle, a vehicle-to-infrastructure, a vehicle-to-network, a vehicle-to-grid communication system, an infrastructure-to-vehicle, an infrastructure-to-infrastructure, an infrastructure-to-network, and/or an infrastructure-to-grid, communication system to communicate (e.g., a CV2X and/or dedicated short range communication (DSRC) protocol).

Accordingly, the communication modules 110, 210, 310 may include one or more transceivers, modulation/demodulation circuits, controllers, routers, and/or input/output interface hardware to perform the functionality described herein.

In one form, the one or more infrastructure sensors 120 are configured to obtain infrastructure sensor data associated with the parking spaces 10. As an example, the one or more infrastructure sensors 120 include image sensors (e.g., a two-dimensional camera, a three-dimensional camera, an infrared sensor, a radar scanner, a laser scanner, a LIDAR sensor, and/or an ultrasonic sensor) that obtain image data (as the infrastructure sensor data) of the parking spaces 10. As described below in further detail, the fleet management system 200 is configured to determine a state of each of the parking spaces 10 based on the infrastructure sensor data. In one form, the infrastructure sensors 120 are disposed on an infrastructure element within the parking lot 5, such as a tower, a light pole, a building, a sign, an automated guided vehicle, among others fixed and/or moveable elements. As an example, the one or more infrastructure sensors 120 may be attached or secured to a drone that is configured to autonomously navigate within or proximate to the parking lot 5 to obtain the infrastructure sensor data. In one form, the one or more infrastructure sensors 120 broadcast the sensor data to the fleet management system 200 via the communication module 110.

In one form, the one or more location sensors 320 are configured to generate location information associated with the vehicle 300 and broadcast the location information to the fleet management system 200. As an example, the one or more location sensors 320 are provided by one or more global navigation satellite system (GNSS) sensors configured to generate and broadcast GNSS data to the fleet management system 200 via the communication modules 210, 310. As described below in further detail, the fleet management system 200 is configured to determine whether a vehicle intrusion may be occurring based on the GNSS data when the state of the parking spaces 10 satisfy one or more predetermined criteria.

In one form, the one or more image sensors 330 are configured to obtain image data of at least one of an interior and an exterior of the vehicle 300. The image sensors 330 may include, but are not limited to, a two-dimensional (2D) camera, a 3D camera, a red-green-blue (RGB)-camera, a stereo vision camera, an infrared sensor, a radar scanner, a laser scanner, a light detection and ranging (LIDAR) sensor, and/or an ultrasonic sensor. As described below in further detail, the fleet management system 200 is configured to determine a probability of a vehicle intrusion based on the image data when the state of the parking spaces 10 satisfy one or more predetermined criteria.

In one form, the vehicle control module 340 is configured to generate state information associated with the vehicle 300. As an example, the vehicle control module 340 is configured to generate and broadcast information indicating whether the vehicle is in one of an on state and an off state. As used herein, the "on state" refers to a state in which an ignition system of the vehicle 300 is set, either manually or automatically, to one of an accessory mode position, an ignition position, and/or a start position. As used herein, the "off state" refers to a state refers to a state in which the ignition system of the vehicle 300 is not in the "ON" state, such as when the ignition system of the vehicle 300 is set, either manually or automatically, to an off position/lock position. As described below in further detail, the vehicle intrusion module 350 may selectively perform a vehicle intrusion routine based on the state of the vehicle 300.

In one form, the navigation instruction module 220 is configured to control a movement of the vehicles 300 within the parking lot 5. As an example, the navigation instruction module 220 is configured to perform one or more known path planning routines to define a path for the vehicles 300 and broadcasts one or more commands to autonomously control the vehicles 300 along the defined paths by employing known autonomous navigation routines. As a more specific example, the navigation instruction module 220 is configured to instruct the vehicles 300 to autonomously navigate to one of the parking spaces 10 provided in the parking lot 5 based on the infrastructure data generated by the one or more infrastructure sensors 120 when one or more validation/inspection routines are completed at one or more vehicle end-of-line (EOL) testing stations and/or the non-transitory computer-readable instructions associated with the vehicle control module 340 are installed on the vehicle 300.

In one form, the parking space state module 230 is configured to determine the state of the parking spaces 10 based on the infrastructure data obtained from the infrastructure sensors 120. The states of the parking spaces 10 may include an occupied state and an unoccupied state. As an example, the parking space state module 230 determines a given parking space is in the unoccupied state in response to the infrastructure sensor data indicating that one of the vehicles 300 is not positioned within an area defined by the given parking space. Additionally, the parking space state module 230 determines the given parking space is in the occupied state in response to the infrastructure sensor data indicating that one of the vehicles 300 is positioned within an area defined by the given parking space for at least a predetermined period of time that corresponds to the vehicle 300 being parked within the given parking space 10. In one form, the parking space state module 230 is configured to continuously determine the state of the parking spaces 10 to thereby generate a dynamic map of the parking lot 5.

Figure 2:
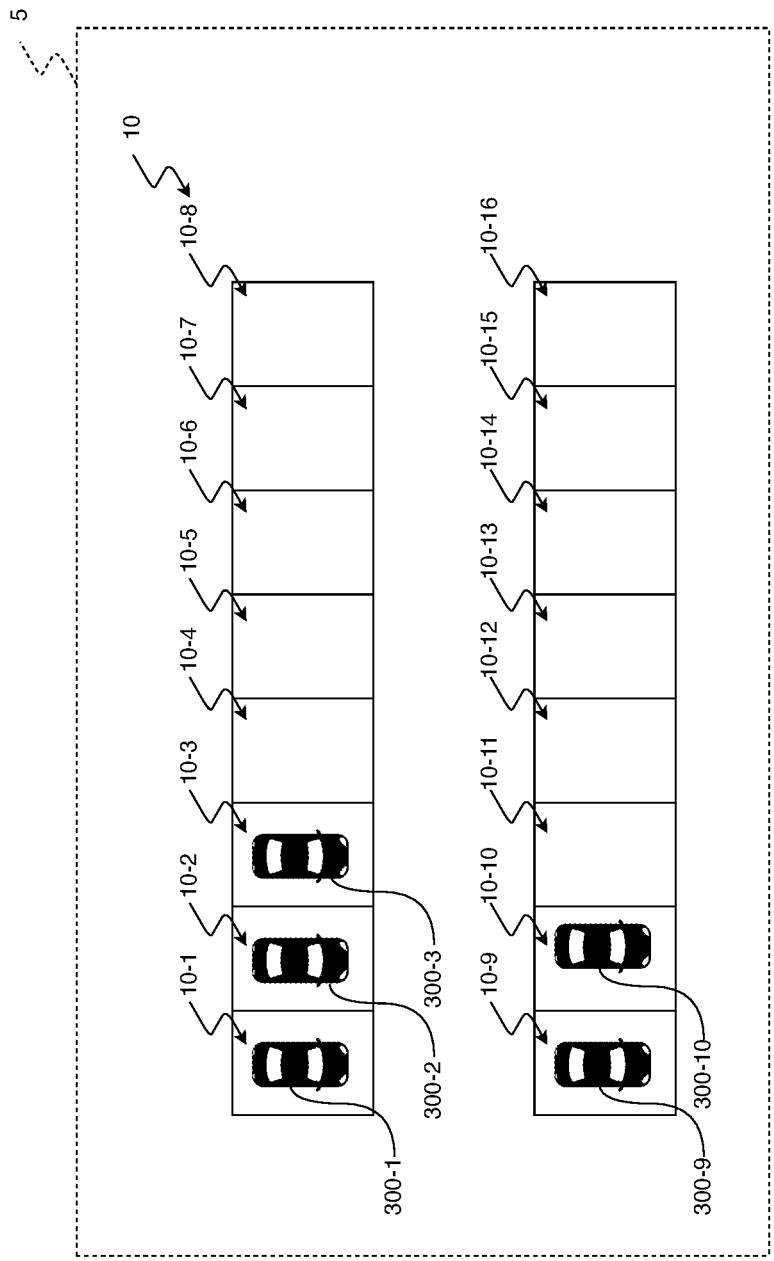
FIG. 2 is a schematic illustration of an example parking lot in accordance with the teachings of the present disclosure.

As an example and referring to FIGS. 1-2, vehicles 300-1, 300-2, 300-3 (as the vehicles 300) autonomously navigate to and position themselves within respective assigned/selected parking spaces 10-1, 10-2, 10-3 from among the plurality of parking spaces 10 based on the commands/instructions obtained from the navigation instruction module 220. Subsequently, the parking space state module 230 sets the parking spaces 10-1, 10-2, 10-3 to the occupied state and sets the parking spaces 10-4, 10-5, 10-6, 10-7, and 10-8 from among the parking spaces 10 to the unoccupied state, as the infrastructure data indicates that one of the vehicles 300 are not provided within the respective parking spaces 10-4, 10-5, 10-6, 10-7, and 10-8.

As another example and with continued reference to FIGS. 1-2, vehicles 300-9, 300-10 (as the vehicles 300) autonomously navigate to and position themselves within respective assigned/selected parking spaces 10-9, 10-10 from among the plurality of parking spaces 10 based on the commands/instructions obtained from the navigation instruction module 220. Subsequently, the parking space state module 230 sets the parking spaces 10-9, 10-10 to the occupied state and sets the parking spaces 10-11, 10-12, 10-13, 10-14, 10-15, and 10-16 from among the parking spaces 10 to the unoccupied state, as the infrastructure data indicates that one of the vehicles 300 are not provided within the respective parking spaces 10-11, 10-12, 10-13, 10-14, 10-15, and 10-16.

In one form, the state transition module 240 is configured to determine whether the parking spaces 10 have transitioned between the occupied state and the unoccupied state based on the infrastructure sensor data. As an example and referring to FIGS. 1 and 3, the state transition module 240 determines that the parking spaces 10-1, 10-2, 10-9 have transitioned from the occupied state to the unoccupied state, as the respective vehicles 300-1, 300-2, 300-9 that were previously positioned within the parking spaces 10-1, 10-2, 10-9, respectively, have departed from the respective parking spaces 10-1, 10-2, 10-9. As another example, the state transition module 240 determines that the parking space 10-11 has transitioned from the unoccupied state to the occupied state, as vehicle 300-11 that was not previously within the parking space 10-11 is now positioned with the parking space 10-11.

In one form, the state transition module 240 is configured to determine whether the corresponding vehicle 300 has transitioned between an off state and an on state based on the vehicle state information generated by the vehicle control module 340. In one form, the state transition module 240 determines whether the vehicle 300 has transitioned between the on and off states in response to determining that one of the parking spaces 10 has transitioned from the occupied state to the unoccupied state. As described below in further detail, the intrusion detection module 250 selectively broadcast a command to the vehicle 300 based on whether the corresponding vehicle 300 has transitioned between an off state and an on state.

In one form, the intrusion detection module 250 is configured to continuously obtain the location data from the location sensors 320 of the vehicle 300 and dynamically store the location data associated with the vehicle 300 when the vehicle 300 is in the on state. When the vehicle 300 transitions from the on state to the off state, as described below in further detail, the intrusion detection module 250 stores previously obtained location data of the vehicle 300 operating in the on state as the current location data of the vehicle 300.

In one form, the intrusion detection module 250 is configured to determine whether a vehicle intrusion condition is satisfied based on the state of the parking spaces, the vehicle state information, and/or the location data. In one form, the intrusion detection module 250 broadcasts a command to the vehicle 300 to initiate the vehicle intrusion routine when the vehicle intrusion condition is satisfied. As an example, in response to the state transition module 240 determining the corresponding vehicle 300 has not transitioned from the off state to the on state and the given parking space has transitioned from the occupied to unoccupied state (i.e., the vehicle 300 has moved without being turned on), the intrusion detection module 250 determines that the vehicle intrusion condition is satisfied and broadcasts a command to the vehicle 300 to initiate the vehicle intrusion routine.

As another example, in response to the state transition module 240 determining that the corresponding vehicle 300 has transitioned from the off state to the on state and the given parking space has transitioned from the occupied to unoccupied state, the intrusion detection module 250 obtains the location data from the vehicles 300 and determines whether the vehicle 300 is located at a predefined location based on the location data. In one form, the predefined location corresponds to areas within or external to the parking lot 5 that are associated with lower probabilities of vehicle intrusions, such as another parking space 10 within the parking lot 5, a repair bay and/or EOL testing station within a manufacturing environment, a charging station within a given environment, a post-production location (e.g., a shipping station in which the vehicles 300 are loaded onto a transportation medium, such as a car carrier trailer), among other types of predefined areas associated with lower probabilities of vehicle intrusions. It should be understood that the predefined areas may be associated with any type of area within a given environment associated with the parking lot 5 and are not limited to the examples described herein. When the intrusion detection module 250 determines that the location data does not correspond to one or more of the predefined locations, the intrusion detection module 250 determines the vehicle intrusion condition is satisfied and instructs the vehicle 300 and, more particularly, the vehicle intrusion module 350 to initiate the vehicle intrusion routine. Otherwise, when the intrusion detection module 250 determines that the location data corresponds to one or more of the predefined locations, the intrusion detection module 250 determines that the vehicle intrusion condition is not satisfied.

Figure 3:
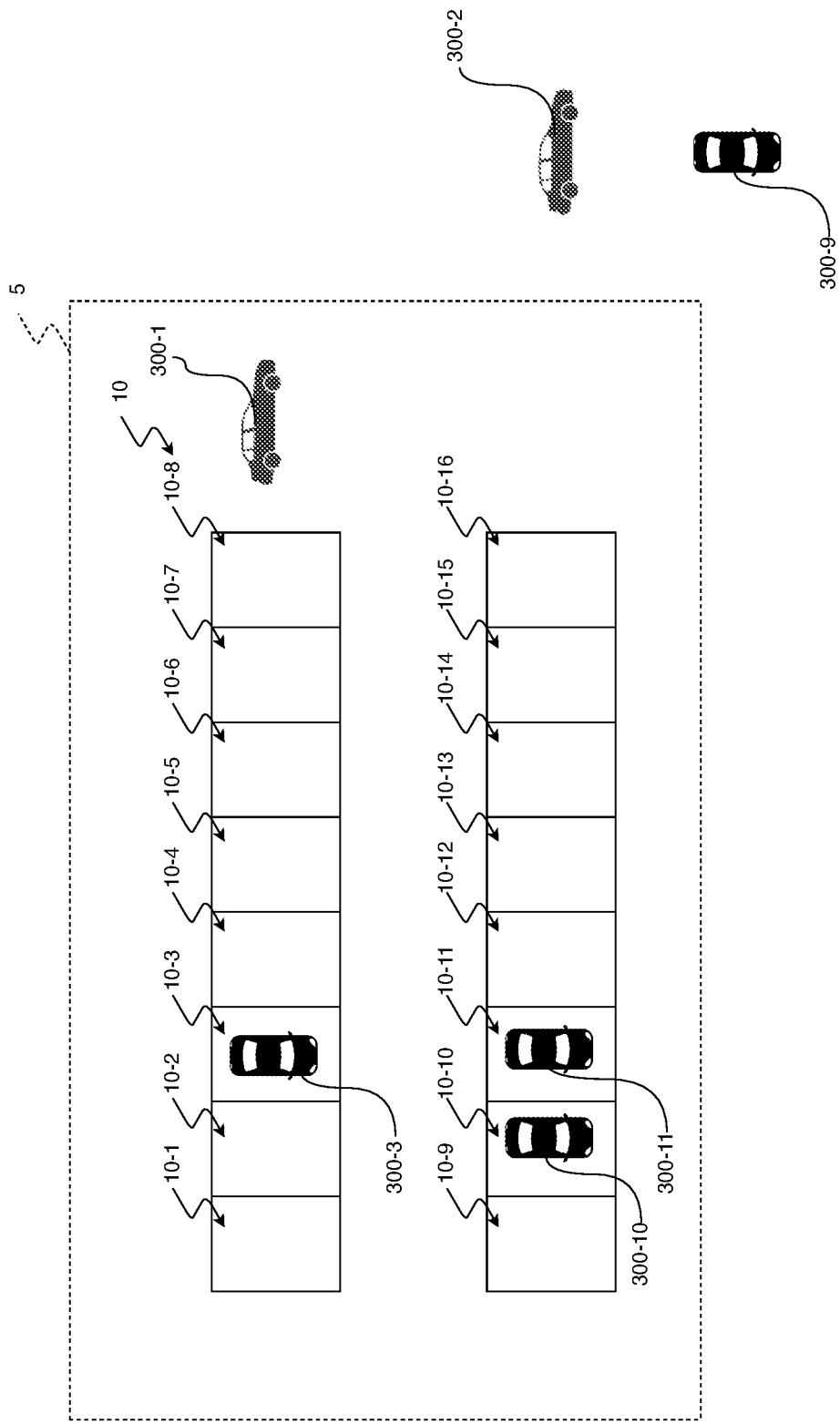
FIG. 3 is a schematic illustration of another example parking lot in accordance with the teachings of the present disclosure.

As a more specific example and referring to FIGS. 1 and 3, the state transition module 240 determines that the parking spaces 10-1, 10-2, 10-9 have transitioned from the occupied state to the unoccupied state as a result of the vehicles 300-1, 300-2, 300-9 departing from the parking spaces 10-1, 10-2, 10-9, as described above. Furthermore, the state transition module 240 determines that vehicles 300-1, 300-2 have transitioned from the off state to the on state, and that the vehicle 300-9 remained in the off state after the parking space 10-9 transitioned from the occupied to the unoccupied state.

In this example, the intrusion detection module 250 obtains the current location data of the vehicles 300-1, 300-2 and determines whether the location data corresponds to one of the predefined locations, such as a location within the parking lot 5. In this example, the intrusion detection module 250 determines that the current location data of the vehicle 300-1 indicates the vehicle 300-1 is within the parking lot 5 and therefore corresponds to a predefined location (i.e., any location within the parking lot 5). As such, the intrusion detection module 250 determines that the vehicle intrusion condition is not satisfied for the vehicle 300-1. Furthermore, the intrusion detection module 250 determines that the current location data of the vehicle 300-2 indicates the vehicle 300-1 is outside of the parking lot 5 and therefore does not correspond to a predefined location. As such, the intrusion detection module 250 determines that the vehicle intrusion condition is satisfied for the vehicle 300-2 and instructs the vehicle intrusion module 350 of the vehicle 300-2 to initiate the vehicle intrusion routine. Moreover, the intrusion detection module 250 determines that. Regarding the vehicle 300-9, the intrusion detection module 250 determines that the vehicle intrusion condition is satisfied due to the movement from the parking lot 5 without being turned on, and the intrusion detection module 250 subsequently instructs the vehicle intrusion module 350 of the vehicle 300-9 to initiate the vehicle intrusion routine.

In one form, the intrusion detection module 250 instructs the vehicles 300 to initiate and perform the vehicle intrusion routine based on the state of the vehicles 300. When the vehicle 300 remains in the off state and the vehicle intrusion condition is satisfied, the intrusion detection module 250 instructs the vehicle 300 to transition to an on state and broadcast the sensor data from one or more sensors of the vehicle 300 to the intrusion detection module 250. When the vehicle 300 is in the on state and the vehicle intrusion condition is satisfied, the intrusion detection module 250 instructs the vehicle 300 to broadcast the sensor data from one or more sensors of the vehicle 300 to the intrusion detection module 250. In response to obtaining the sensor data, the intrusion detection module 250 is configured to determine a probability of a vehicle intrusion based on the sensor data and deactivate one or more functions of the vehicle 300 in response to the probability of the vehicle intrusion being greater than a threshold probability value. Deactivating one or more functions of the vehicle 300 may include, but is not limited to, disabling the vehicle 300, disabling one or more control systems of the vehicle 300, and/or autonomously navigating the vehicle 300 to a predetermined destination (e.g., a police station and/or other similar types of destinations).

As an example, the intrusion detection module 250 may obtain image data corresponding to an interior and/or exterior of the vehicle 300 from the one or more image sensors 330. The image data may provide information indicative of a surrounding environment of the vehicle 300, occupants of the vehicle, and/or other information that may be relevant to a vehicle intrusion. Subsequently, the intrusion detection module 250 may determine a probability of a vehicle intrusion based on the image data and by employing known image processing routines, such as a machine learning routine. As a specific example, the intrusion detection module 250 may include a convolutional neural network, a deep neural network, and/or a generative adversarial network that is trained to interpret the image data and generate the probability of the vehicle intrusion. As another specific example, the intrusion detection module 250 is configured to perform a difference-based image processing routine, where the intrusion detection module 250 compares the image data to reference image data of the vehicle 300 to generate the probability of the vehicle intrusion. As yet another specific example, the intrusion detection module 250 is configured to perform a semantic-based image processing routine, where the intrusion detection module 250 compares classified objects of the image data to reference image data to detect whether an anomalous state exists to generate the probability of the vehicle intrusion.

As an additional example, the intrusion detection module 250 may obtain GNSS data from a GNSS sensor of the vehicle 300 (as the one or more location sensors 320). Subsequently, the intrusion detection module 250 may determine a probability of a vehicle intrusion based on the GNSS data and by employing known supervised machine learning routines to determine whether the GNSS data corresponds to a vehicle intrusion. As an example, the supervised machine learning routines may generate the probability of the vehicle intrusion based on the location, trajectory, and/or speed of the vehicle 300 as indicated by the GNSS data.

Figure 4:
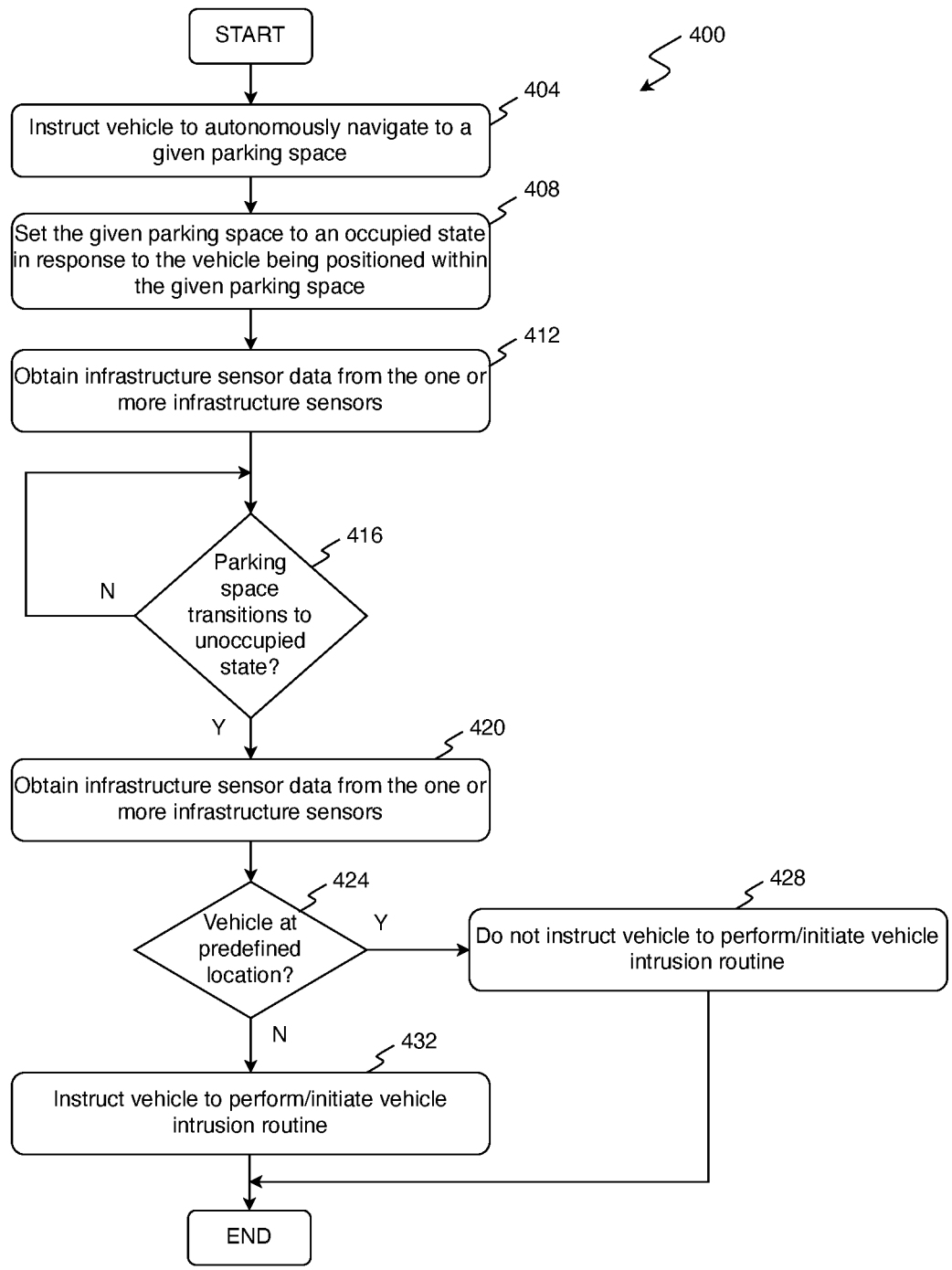
FIG. 4 is a flowchart of another example routine in accordance with the teachings of the present disclosure.

Referring to FIG. 4, a flowchart illustrating a routine 400 for monitoring vehicle intrusions in the parking lot 5 is shown. At 404, the fleet management system 200 instructs one of the vehicles 300 to autonomously navigate to a given parking space from among the plurality of parking spaces 10 (e.g., an assigned parking space). At 408, the fleet management system 200 sets the given parking space to an occupied state in response to the vehicle 300 being positioned within the given parking space. At 412, the fleet management system 200 obtains infrastructure sensor data from the one or more infrastructure sensors 120, where the infrastructure sensor data includes information indicating a parking state of each of the plurality of parking spaces 10. At 416, the fleet management system 200 determines whether the given parking space has transitioned from the occupied state to the unoccupied state based on the infrastructure sensor data. If the parking space has transitioned to the unoccupied state, the routine 400 proceeds to 420. Otherwise, if the parking space has not transitioned to the unoccupied state, the routine 400 remains at 416. At 420, the fleet management system 200 obtains the location data from the vehicle 300. At 424, the fleet management system 200 determines whether the vehicle 300 is located at a predefined location based on the location data. If the vehicle 300 is located at one of the predefined locations, the routine 400 proceeds to 428, where the fleet management system 200 does not instruct the vehicle 300 to perform/initiate the vehicle intrusion routine. If the vehicle 300 is not located at one of the predefined locations, the routine 400 proceeds to 432, where the fleet management system 200 instructs the vehicle 300 to perform/initiate the vehicle intrusion routine.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for monitoring vehicle intrusions in a parking lot comprising a plurality of parking spaces, the method comprising:
   instructing a vehicle to autonomously navigate to a given parking space from among the plurality of parking spaces;
   setting the given parking space to an occupied state in response to the vehicle being positioned within the given parking space;
   obtaining infrastructure sensor data from an infrastructure sensor, wherein the infrastructure sensor data includes information indicating a parking state of each of the plurality of parking spaces, and wherein the parking state is one of the occupied state and an unoccupied state;
   determining whether the given parking space has transitioned from the occupied state to the unoccupied state based on the infrastructure sensor data; and
   in response to determining the given parking space has transitioned to the unoccupied state:
      obtaining location data from the vehicle;
      determining whether the vehicle is located at a predefined location based on the location data; and
      instructing the vehicle to perform a vehicle intrusion routine in response to the vehicle not being located at the predefined location.

2. The method of claim 1 further comprising determining whether the vehicle has transitioned from an off state to an on state in response to determining the given parking space has transitioned to the unoccupied state.

3. The method of claim 2 further comprising performing the vehicle intrusion routine in response to determining the vehicle has not transitioned from the off state to the on state.

4. The method of claim 1, wherein instructing the vehicle to perform the vehicle intrusion routine comprises:
   instructing the vehicle to transition to an on state; and
   instructing the vehicle to broadcast sensor data from one or more sensors of the vehicle.

5. The method of claim 4, wherein the one or more sensors includes an image sensor, wherein the sensor data is image data, and wherein the method further comprises:
   obtaining the image data from the image sensor; and
   determining a probability of the vehicle intrusion based on the image data.

6. The method of claim 5, wherein the image data is associated with an interior of the vehicle.

7. The method of claim 5, wherein the image data is associated with an exterior of the vehicle.

8. The method of claim 5 further comprising deactivating one or more functions of the vehicle in response to the probability of the vehicle intrusion being greater than a threshold probability value.

9. The method of claim 4, wherein the one or more sensors includes a global navigation satellite system (GNSS) sensor, wherein the sensor data is GNSS data, and wherein the method further comprises:
   obtaining the GNSS data from the GNSS sensor of the vehicle; and
   determining a probability of the vehicle intrusion based on the GNSS data.

10. The method of claim 9 further comprising deactivating one or more functions of the vehicle in response to the probability of the vehicle intrusion being greater than a threshold probability value.

11. A system for monitoring vehicle intrusions in a parking lot comprising a plurality of parking spaces, the system comprising:
   one or more processors; and
   one or more nontransitory computer-readable mediums comprising instructions that are executable by the one or more processors, wherein the instructions comprise:
      instructing a vehicle to autonomously navigate to a given parking space from among the plurality of parking spaces;
      setting the given parking space to an occupied state in response to the vehicle being positioned within the given parking space;
      obtaining infrastructure sensor data from an infrastructure sensor, wherein the infrastructure sensor data includes information indicating a parking state of each of the plurality of parking spaces, and wherein the parking state is one of the occupied state and an unoccupied state;
      determining whether the given parking space has transitioned from the occupied state to the unoccupied state based on the infrastructure sensor data; and
      in response to determining the given parking space has transitioned to the unoccupied state:
         obtaining location data from the vehicle;
         determining whether the vehicle is located at a predefined location based on the location data;
         instructing the vehicle to transition to an on state;
         instructing the vehicle to broadcast sensor data from one or more sensors of the vehicle; and
         instructing the vehicle to perform a vehicle intrusion routine in response to the vehicle not being located at the predefined location.

12. The system of claim 11, wherein the instructions further comprise determining whether the vehicle has transitioned from an off state to an on state in response to determining the given parking space has transitioned to the unoccupied state.

13. The system of claim 12, wherein the instructions further comprise performing the vehicle intrusion routine in response to determining the vehicle has not transitioned from the off state to the on state.

14. The system of claim 11, wherein the one or more sensors includes an image sensor, wherein the sensor data is image data, and wherein the instructions further comprise:
   obtaining the image data from the image sensor; and
   determining a probability of the vehicle intrusion based on the image data.

15. The system of claim 14, wherein the image data is associated with an interior of the vehicle.

16. The system of claim 14, wherein the image data is associated with an exterior of the vehicle.

17. The system of claim 14, wherein the instructions further comprise deactivating one or more functions of the vehicle in response to the probability of the vehicle intrusion being greater than a threshold probability value.

18. The system of claim 11, wherein the one or more sensors includes a global navigation satellite system (GNSS) sensor, wherein the sensor data is GNSS data, and wherein the instructions further comprise:
   obtaining the GNSS data from the GNSS sensor of the vehicle; and
   determining a probability of the vehicle intrusion based on the GNSS data.

19. The system of claim 18, wherein the instructions further comprise deactivating one or more functions of the vehicle in response to the probability of the vehicle intrusion being greater than a threshold probability value.

20. A method for monitoring vehicle intrusions in a parking lot comprising a plurality of parking spaces, the method comprising:
   instructing a vehicle to autonomously navigate to a given parking space from among the plurality of parking spaces;
   setting the given parking space to an occupied state in response to the vehicle being positioned within the given parking space;
   obtaining infrastructure sensor data from an infrastructure sensor, wherein the infrastructure sensor data includes information indicating a parking state of each of the plurality of parking spaces, and wherein the parking state is one of the occupied state and an unoccupied state;
   determining whether the given parking space has transitioned from the occupied state to the unoccupied state based on the infrastructure sensor data; and
   in response to determining the given parking space has transitioned to the unoccupied state:
      obtaining location data from the vehicle;
      determining whether the vehicle is located at a predefined location based on the location data;
      instructing the vehicle to transition to an on state;
      instructing the vehicle to broadcast sensor data from one or more sensors of the vehicle; and
      instructing the vehicle to perform a vehicle intrusion routine in response to the vehicle not being located at the predefined location.

* * * * *